United States Patent Office 3,649,544
Patented Mar. 14, 1972

3,649,544
SKIN PROTECTIVE WASHING AND CLEANSING COMPOSITIONS
Ernst Gotte, Ratingen-Tiefenbroich, and Rudi Heyden, Dusseldorf, Germany, assignors to Henkel & Cie, G.m.b.H., Dusseldorf-Holthausen, Germany
No Drawing. Filed Nov. 14, 1968, Ser. No. 775,908
Claims priority, application Germany, Dec. 14, 1967, H 64,775
Int. Cl. C11d 1/22, 1/831, 3/30
U.S. Cl. 252—544                     4 Claims

ABSTRACT OF THE DISCLOSURE

Washing and cleansing compositions having a content of anionic surface active agents and an effective amount of a skin-protective polyamine derivative, said polyamine derivative being in a form selected from the group consisting of water-dispersible polyamine derivatives and water-soluble acid addition salts thereof and being the reaction product of 1 mol of a bis-halohydrinether of the formula

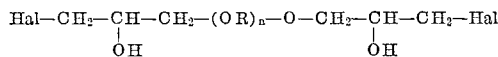

and from 1 to 2 mols of a polyalkyleneamine of the formula

wherein R is selected from the group consisting of ethylene, propylene, butylene, pentamethylene and hexamethylene, R' is selected from the group consisting of R and cyclohexylene, Hal represents a halogen, $m$ represents an integer from 1 to 5 and $n$ represents an integer from 1 to 20.

THE PRIOR ART

It is known that surface-active compounds containing sulfonate and sulfate groups are more or less inclined to form salt-like linkages with the epidermis of the human skin. Owing to this, the outer layers of the epidermis lose their elasticity, become cracked and prematurely rubbed off, which causes a stickiness, stretched or burning sensation to the skin of the persons affected and leads to considerable itching.

These drawbacks of the anionic surface-active compounds can be lessened to a certain extent by addition of soluble proteins or protein degradation products. The proteins, however, are biologically quickly decomposed, so that their practical application is narrowly restricted. Further, alkylamineoxides have been used for the same purpose, but these themselves are relatively aggressive to the skin and therefore not suitable for all purposes.

OBJECTS OF THE INVENTION

An object of the present invention is the development of washing and cleansing compositions containing anionic surface-active agents and a content of a skin protective polyamine derivative.

Another object of the present invention is the obtention of washing and cleansing compositions having a content of anionic surface-active agents and an effective amount of a skin-protective polyamine derivative, said polyamine derivative being in a form selected from the group consisting of water-dispersible polyamine derivatives and water-soluble acid addition salts thereof and being the reaction product of 1 mol of a bis-halohydrinether of the formula

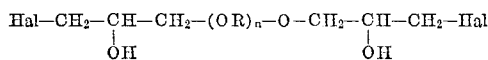

and from 1 to 2 mols of a polyalkyleneamine of the formula $$NH_2-(R'-NH)_m-R'-NH_2$$

wherein R is selected from the group consisting of ethylene, propylene, butylene, pentamethylene and hexamethylene, R' is selected from the group consisting of R and cyclohexylene, Hal represents a halogen, $m$ represents an integer from 1 to 5 and $n$ represents an integer from 1 to 20.

These and other objects of the invention will become more apparent as the description thereof proceeds.

DESCRIPTION OF THE INVENTION

It has now been discovered that the skin irritation of washing and cleansing agents containing anionic surface active agents can be decreased or eliminated by a content of certain polyamine derivatives. More particularly, according to the present invention, there are provided washing and cleansing compositions having a content of anionic surface active agents and an effective amount of a skin-protective polyamine derivative, said polyamine derivative being in a form selected from the group consisting of water-dispersible polyamine derivatives and water-soluble acid addition salts thereof and being the reaction product of 1 mol of a bishalohydrinether of the formula

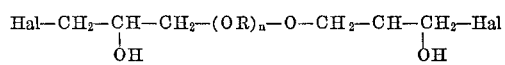

and from 1 to 2 mols of a polyalkyleneamine of the formula

wherein R is selected from the group consisting of ethylene, propylene, butylene, pentamethylene and hexamethylene, R' is selected from the group consisting of R and cyclohexylene, Hal represents a halogen, $m$ represents an integer from 1 to 5 and $n$ represents an integer from 1 to 20.

The polyamine derivatives are preferably present in the form of their water-soluble salts, for example salts of organic acids, preferably alkanoic acids such as their acetates: salts of mineral acids such as their chlorides, bromides and sulfates; or salts of acid alkylsulfates such as their alkylsulfates.

Suitable starting substances for the preparation of the bishalohydrinethers to be used according to the invention are glycols with 1 to 6 carbon atoms, such as ethylene glycol, propylene glycol, butanediol, pentanediol or hexanediol or the polyethers of the aforementioned glycols, such as di-, tri-, or poly-ethylene glycol, di-, tri- or polypropylene glycol or the corresponding polybutylene glycols with not more than 20 glycol ether groups. Mixed glycol ethers, for example those from ethylene and propylene glycols, may also be used.

The said glycols and polyglycols are converted into the bis-halohydrinethers in known way, suitably by reaction with epichlorohydrin or epibromohydrin. The polyamine derivatives to be used according to the invention are obtained by reacting these bis-halohydrinethers with di-, tri- or polyalkyleneamines. Amines suitable for this are, for example, diethylenetriamine, triethylenetetramine, tetraethylenepentamine and their higher homologs, and also dipropylenetriamine, tripropylenetetramine and polyalkylenepolyamines, the alkyl residues of which contain up to 6 carbon atoms. The alkyl residues may be straight-chain, branched-chain or cycloaliphatic, as in the case of the dicyclohexylenetriamine.

By the choice of the molar ratio of bis-chlorohydrinether to polyalkyleneamine within a range from 1:1 to 1:2, preferably 1:1 to 1:1.5, the degree of polymerization can be varied. Within the preferred range the skin-protecting action is largely independent of the molar ratio and therefore also of the average degree of polymerization.

The polyamine derivatives to be used according to the invention are insoluble in water, and readily soluble in dilute organic or inorganic acids such as hydrochloric acid, hydrobromic acid, sulfuric acid, alkylsulfuric acid, formic acid or acetic acid. These solutions may give turbidities or precipitates with the anionic surface-active compounds, which, however, dissolve again with an excess of one of the two components. The polyamine derivatives, however, can also be dispersed or dissolved in solutions of the surface-active compounds without first having to be converted into the salt form.

The polyamine derivatives to be used according to the invention may further contain minor amounts of unreacted starting substances, which may be removed by extraction with organic solvents and if desired returned to the reaction. Since these compounds are not detrimental to the properties of the washing and cleaning agents, however, a separation is not generally necessary.

The polyamine derivatives or their water-soluble salts may be added to any washing or cleansing agents, whatever their composition, which contain anionic detergent substances. Examples of such anionic detergent substances are alkylbenzenesulfonates, olefinsulfonates, such as are obtained, for example, by sulfonation of primary or secondary aliphatic mono-olefins with gaseous $SO_3$ and subsequent alkaline or acid hydrolysis, and also alkylsulfonates and $\alpha$-sulpho-fatty acid esters, primary and secondary alkyl sulfates, and the sulfates of ethoxylated or propoxylated fatty alcohols. Further compounds of this class which may possibly be present in the washing agents, are the higher molecular weight sulfated partial ethers and partial esters of polyhydric alcohols, such as the alkali metal salts of the monoalkylethers or monofatty acid esters of glycerine monosulfuric acid ester or of 1,2-dihydroxypropanesulfonic acid. Further, the sulfates of ethoxylated or propoxylated fatty acid amides and alkylphenols and fatty acid taurides and fatty acid isothionates are suitable.

Besides the said anionic surface-active compounds of the sulfonate and sulfate types given above, which are the most aggressive against the skin, the washing agents may contain alkali metal soaps of fatty acids, ampholytes such as alkylbetaines and alkylsulfobetaines, and also nonionic detergent substances such as alkyl and acyl polyglycol ethers, alkylphenol polyglycol ethers, mixed condensates from polyethylene glycol and polypropylene glycol, and polyglycol ether derivatives of alkylamines and fatty acid alkanolamides. The said detergent substances may also be present in admixture in the washing and cleansing agents.

If the said detergent compounds contain an aliphatic hydrocarbon residue, this should preferably be a straight chain and have 8 to 22 carbon atoms. In the compounds with araliphatic hydrocarbon residues, the preferably unbranched alkyl chains contain an average of 6 to 16 carbon atoms.

The washing and cleansing agents may also contain further customary components according to the purpose for which they are to be used, such as pyrophosphates, polyphosphates and higher condensed phosphates, as well as silicates, in the form of their alkali metal salts, oxygen-yielding or active chlorine-containing bleaching agents such as alkali metal perborates, alkali metal percarbonates, alkali metal hypochlorites, chlorinated cyanuric acids and their alkali metal salts, stabilizers such as magnesium silicate, and neutral salts such as sodium sulfate. Further, sequestering agents may also be present, especially alkali metal salts of aminopolycarboxylic acids, for example the sodium salts of aminotriacetic acid or ethylenediaminetetraacetic acid, and also the alkali metal salts of hydroxyalkyldiphosphonic acids and aminopolyphosphonic acids, for example the disodium salt of 1-hydroxyethane-1,1-diphosphonic acid and the hexasodium salt of aminotri-(methylenephosphonic acid). Moreover, foam stabilizing agents may be components of the mixture, such as fatty acid mono- and di-alkylolamides, or foam-inhibiting substances, especially the reaction products of 1 mol of cyanuric chloride with 2 to 3 mols of primary or secondary amines with 4 to 20 carbon atoms, and also the usual greyness inhibitors such as carboxymethylcellulose, enzymes, dyestuffs and perfumes, optical brighteners, disinfectants and preservatives, as well as handle-improving agents.

The washing and cleansing agents of the invention may be present in solid, i.e. in lumps or powder form, and as solutions or pastes. In addition to the aforementioned components, liquid preparations may also contain hydrotropic substances such as low molecular weight alkylbenzene sulfonates, urea and organic solvents. Moreover, abrasives consisting of mineral eq. or synthetic resin granulates may be present in solid or liquid polishing or scouring agents.

The washing and cleansing agents may contain from about 1% to 60%, preferably 3% to 30% by weight of the polyamine derivatives to be used according to the invention, based on the amount of the surface-active sulfonate and sulfate raw materials. Larger amounts than 60% by weight do not appreciably improve the skin-protective action, and smaller amounts than 1% only show a relatively small effect.

The additives according to the invention possess valuable skin-protecting and skin-care properties and do not impair the cleansing power of the basic washing materials. They are therefore suitable both for body and hair washing agents and for inserting in fine and coarse washing agents for textiles, as additions to dish-washing agents as well as every kind of cleaning, polishing and scouring agent.

The following specific embodiments are illustrative of the practice of the invention. They are not, however, to be deemed limitative in any respect.

EXAMPLES

In the following examples the skin-protective action was determined by the zein method.

The solubility of zein, a protein from the hull of the maize grains, in solutions of surface-active compounds is a measure of their compatibility with the skin, since the dissolving power of a solution of surface-active compounds for zein and skin protein are parallel. The skin tolerance of n-dodecylbenzenesulfonate solutions with and without addition of the skin-protective substances according to the invention was determined by this method as described below.

40 ml. of a solution which contains 10 gm. per liter of the surface-active compound and having a neutral reaction for exact comparisons, were tempered in a 50 ml. narrow-necked flask in a water-bath at 35° C. 2 gm. of commercial zein of Eastman Organic Chemicals were added and the mixture was shaken vigorously by hand in order to prevent formation of lumps. The narrow-necked flask was then clamped in an air thermostat and allowed to rotate at 5 r.p.m. at 35° C. for an hour. A part of the solution was centrifuged and passed through a wide-pore filter. The clear, now more or less yellow-colored solution was tested for nitrogen content by the micro-Kjeldahl method. 1 ml. was decomposed by heating in a 100 ml. Kjeldahl flask with a little selenium reaction mixture and about 3 ml. of concentrated sulfuric acid until the liquid was clear. In a distillation apparatus, the solution was treated with an excess of a 20% sodium hydroxide solution and the ammonia formed was distilled into a receiver containing 10 ml. of $\frac{1}{20}$ N sulfuric acid. The unused sulfuric acid was back titrated with $\frac{1}{20}$ N sodium hydroxide. A consumption of 1 ml. of $\frac{1}{20}$ N sulfuric acid corresponds to 70 mgm. of nitrogen in 100 ml. of solution of surface-active compounds.

If the surface-active compound contains nitrogen, which is decomposed at the same time, this fraction must be ascertained and subtracted from the total amount. The zein value is indicated in mgm. of N which are contained in 100 ml. of solution of surface-active compounds.

A zein value of 350 is taken as the limiting value for a good skin compatibility. In the following Table 1, the values are grouped together for pure n-dodecylbenzenesulfonate (Na salt).

TABLE I

| Gms./liter of surface-active compound | Zein value | Practical result on skin |
|---|---|---|
| 10 | 650 | Incompatible. |
| 9 | 600 | Do. |
| 8 | 550 | Do. |
| 4.85 | 350 | Compatible. |

Examples 1 to 4 are grouped in the following Table 2. Moreover, two comparative experiments were added in which the added substances were used which are stated in the literature to be especially kind to the skin.

Further, the changes in the skin were observed in the case of 10 persons who immersed their hands daily for five minutes in a solution of 3 gm. per liter of surface-active compound. When a pure solution of surface-active compound was used, all the people noted a stickiness of the skin; on the second day, 7 people complained of considerable burning and a reddening of the skin, 2 people felt an itching. When the experiments were concluded after 2 days, scaling off of the skin occurred, especially between the fingers and on the palm of the hand.

When 15% of one of the condensation products mentioned in Examples 1 to 4 was added to the solution of surface-active compounds, no changes were noted in the first three days of the experiment. Only on the fourth day, a slight stickiness and reddening became noticeable with some people and with one person there was a slight burning of the skin.

For the preparation of the polyamine derivatives used in the following examples, 1 mol of a glycol or polyglycol was first condensed with 2 mols of epichlorohydrin in the presence of 1% by weight of boron trifluoride by heating for one hour at 65–75° C. After addition of 1 mol of a polyamine and 2 mols of sodium hydroxide in 10% aqueous solution, the mixture was heated under reflux for two hours, and, after cooling was adjusted to a pH value of 6 with hydrochloric acid. The solution may either be used in this form or evaporated to dryness.

The surface active compound is Na-n-dodecylbenzenesulfonate.

compound as Na salts), with a concentration used of 0.5 gm./liter of surface-active compound on repeated use as a dish-rinsing agent, caused skin irritation in the people used for the experiment. When, however, 1% by weight of a condensation product according to Example I was previously added to the rinsing agent in the form of the acetate, the skin irritation failed to appear without any reduction in the efficiency of the rinsing taking place.

Example VI

Example V was repeated with a rinsing agent which contained, instead of alkane sulfonate, the same quantity of n-dodecylbenzenesulfonate. The skin irritations ceased when the rinsing agent contained 1% by weight of a condensation product according to Example I in the form of the acetate incorporated into the agent.

Example VII

Pulverulent fine washing agents according to the following formulation showed no skin irritation when used in a concentration of 0.5 to 5 gm. per liter:

5% to 50% by weight of an anionic washing material from the class of the dodecylbenzenesulfonates, olefinsulfonates, alkanesulfonates, fatty alcohol sulfates and alkylpolyglycol ether sulfates, and their mixtures, 0 to 25% by weight of a non-ionic washing material from the class of the ethoxylated and/or propylated fatty alcohols, alkylphenols, fatty acids and fatty acid amides and their mixtures, 0 to 50% by weight of a complex-forming compound from the class of the di- or tri-phosphates, aminopolycarboxylic acids and aminopolyphosphonic acids in the form of their alkali metal or ammonium salts, and mixture of the said compounds, 0 to 30% by weight of the usual detergent additives from the class of the percompounds, optical brighteners, dyestuffs and perfumes, celluloseglycolic acid salts and neutral salts, such as sodium sulfate, 1% to 5% by weight of skin-protective substances according to Examples I to IV.

Example VIII

Liquid rinsing and fine washing agents according to the following formulation showed no skin irritation when the concentration used was 0.5 to 5 gm. per liter.

5% to 40% by weight of an anionic washing material from the class of the dodecylbenzenesulfonates, olefinsulfonates, alkanesulfonates, fatty alcohol sulfates and alkylpolyglycol ether sulfates, and their mixtures, 0 to 20% by weight of a non-ionic washing material from the class of the ethoxylated and/or propylated fatty

TABLE 2

| | | | The zein value was 350 at— | |
|---|---|---|---|---|
| Example | Addition of condensation products in the form of their chlorides (molar ratio 1:1) from— | Zein value 8 gm./l. surface active compound 2 gm./l. of additive | Highest amount of surface active compound, gm./l. | Lowest amount of additive, gm./l. |
| 1 | Triethylenetetramine plus the butenediol-bis-chlorohydrin ether. | 320 | 8.2 | 1.8 |
| 2 | Triethylenetetramine plus the triethylene-glycol-bis-chlorohydrin ether. | 350 | 8.0 | 2.0 |
| 3 | Triethylenetetramine plus the diethylene-glycol-bis-chlorohydrin ether. | 335 | 8.1 | 1.9 |
| 4 | Diethylenetriamine plus the dipropylene-glycol-bis-chlorohydrin ether. | 350 | 8.0 | 2.0 |
| Comparison | Dodecyldimethylamine oxide. | 490 | 6.3 | 3.7 |
| Do | Oleic acid amide of diethylenetriamine. | 462 | 6.6 | 3.4 |

Example V

An aqueous rinsing agent, containing 12.5% by weight of a sec.-alkylsulfonate having chain lengths $C_{14}$–$C_{18}$, 12.5% by weight of a coconut fatty alcohol reacted with 2 mols of ethylene oxide and then sulfated (surface-active alcohols, alkylphenols, fatty acids and fatty acid amides, and their mixtures, 0 to 30% by weight of complex-forming compounds from the class of the di- or tri-phosphates, aminopolycarboxylic acids and aminopolyphosphonic acids in the form of their alkali metal, ammonium or organic ammonium salts, and mixtures of the said compounds, 0 to 10% by weight of solution aids from the class of the benzenes-, toluene- and xylene-sulfonates and/or urea, 0 to 2% by weight of the usual detergent additives from the class of optical brighteners, dyestuffs and perfumes, 20% to 60% by weight of water and/or low molecular weight alcohols, preferably water-miscible lower alkanols, 1% to 5% by weight of skin-protective substances according to Examples I to IV.

The preceding specific embodiments are illustrative of the practice of the invention. It is to be understood, however, that other expedients known to those skilled in the art may be employed without departing from the spirit of the invention.

We claim:

1. Washing and cleaning compositions consisting essentially of (1) a detergent composition consisting essentially of from 5% to 100% of anionic surface-active agents selected from the group consisting of sulfates and sulfonates in combination with (2) from about 1% to 60% by weight based on the amount of said surface-active sulfonates and sulfates, of a skin protective polyamine derivative, said polyamine derivative being selected from the group consisting of the water-dispersible polyamine derivative and water-soluble acid addition salts thereof and being the reaction product of 1 mol of a bis-halohydrin ether of the formula

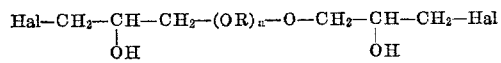

with from 1 to 2 mols of a polyalkyleneamine of the formula

wherein R is selected from the group consisting of ethylene, propylene, butylene, pentamethylene and hexamethylene, R' is selected from the group consisting of R and cyclohexylene, Hal represents a halogen selected from the group consisting of chlorine and bromine, $m$ represents an integer from 1 to 5 and $n$ represents an integer from 1 to 20, said reaction product being obtained by the reaction of said bis-halohydrin ether with said polyalkyleneamine in the presence of about 2 mols of aqueous sodium hydroxide at the reflux temperature.

2. The washing and cleansing composition as defined in claim 1 wherein said polyamine derivative is the reaction product of 1 mol of said bis-halohydrin ether with from 1 to 1.5 mols of said polyalkyleneamine.

3. The washing and cleansing composition as defined in any one of claims 1 and 2 wherein said polyamine derivative is in the form of a water-soluble acid addition salt thereof.

4. The washing and cleansing composition as defined in any one of claims 1 and 2 wherein said polyamine derivative is present in an amount of from 3% to 30% by weight, based on the amount of said surface-active sulfonates and sulfates.

References Cited
UNITED STATES PATENTS

| | | | |
|---|---|---|---|
| 2,921,050 | 1/1960 | Belanger | 260—584 B |
| 3,272,757 | 9/1966 | Kirkpatrick et al. | 260—584 B |
| 3,304,349 | 2/1967 | Ting-Shen | 252—152 X |
| 3,347,803 | 10/1967 | Frotscher | 252—8.8 X |
| 3,538,009 | 11/1970 | Kelly et al. | 252—152 |
| 3,548,056 | 12/1970 | Eigen et al. | 252—152 X |

LEON D. ROSDOL, Primary Examiner

D. SILVERSTEIN, Assistant Examiner

U.S. Cl. X.R.

252—527, 535, 550, 554, 531